US008233660B2

(12) United States Patent
Fritsch et al.

(10) Patent No.: US 8,233,660 B2
(45) Date of Patent: Jul. 31, 2012

(54) SYSTEM AND METHOD FOR OBJECT MOTION DETECTION BASED ON MULTIPLE 3D WARPING AND VEHICLE EQUIPPED WITH SUCH SYSTEM

(75) Inventors: Jannik Fritsch, Muehlheim (DE); Thomas Michalke, Stuttgart (DE); Robert Kastner, Frankfurt (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 316 days.

(21) Appl. No.: 12/650,030

(22) Filed: Dec. 30, 2009

(65) Prior Publication Data
US 2010/0183192 A1      Jul. 22, 2010

(30) Foreign Application Priority Data

Jan. 16, 2009  (EP) .................................... 09150710
Dec. 17, 2009  (EP) .................................... 09179636

(51) Int. Cl.
*G06K 9/00*           (2006.01)
(52) U.S. Cl. ........................................ 382/103; 382/104
(58) Field of Classification Search .................. 382/103, 382/100, 102, 105, 104, 181; 701/96
See application file for complete search history.

(56) References Cited

U.S. PATENT DOCUMENTS

| 6,795,014 | B2 * | 9/2004 | Cheong | 342/118 |
| 7,266,220 | B2 * | 9/2007 | Sato et al. | 382/104 |
| 7,764,808 | B2 * | 7/2010 | Zhu et al. | 382/104 |
| 8,064,643 | B2 * | 11/2011 | Stein et al. | 382/104 |
| 2004/0080450 | A1 * | 4/2004 | Cheong | 342/118 |
| 2004/0183905 | A1 * | 9/2004 | Comaniciu et al. | 348/148 |

FOREIGN PATENT DOCUMENTS
WO     WO2009024349     * 2/2009

OTHER PUBLICATIONS

Tobi Vaudrey et al., "Integrating Disparity Images by Incorporating Disparity Rate", The University of Auckland, 2008, pp. 29-42.
Hideki Tanahashi et al., "Acquisition of Three-Dimensional Information in a Real Environment by Using the Stereo Omni-directional System (SOS)", IEEE, 2001, pp. 365-371.
Marcos Nieto et al., "Stabilization of Inverse Perspective Mapping Images based on Robust Vanishing Point Estimation", IEEE Intelligent Vehicles Symposium, Jun. 13-15, 2007, pp. 315-320.
Kurt Konolige, "Small Vision Systems: Hardware and Implementation", XP-002543568, 1997, pp. 1-10.
M. Bertozzi et al., "Obstacle Detection and Classification Fusing Radar and Vision", IEEE Intelligent Vehicles Symposium, Jun. 4-6, 2008, pp. 608-613.
Sanae Shimizu et al., Moving Object detection by mobile Stereo Omni-directional System (SOS) using spherical depth image, Pattern Anal Applic, 2006, pp. 113-126, published online Nov. 8, 2005.
Ashit Talukder et al., "Real-time Detection of Moving Objects from Moving Vehicles using Dense Stereo and Optical Flow", Proceedings of 2004 IEEE/RSJ International Conference on Iltelligent Robots Systems, Sep. 28-Oct. 2, 2004 pp. 3718-3725.
Jannik Fritsch et al., "Towards a Human-like Vision System for Driver Assistance", 2008 IEEE Intelligent Vehicles Symposium, Eindhoven University of Technology, Jun. 4-6, 2008, pp. 275-282.
Thomas Michalke et al., "A Generic Temporal Integration Approach for Enhancing Feature-based Road-detection Systems", Proceedings of the 11th International IEEE Conference on Intelligent Transportation Systems, Oct. 12-15, 2008, pp. 657-663.
Peter Rander et al., "Virtualized Reality: Constructing Time-Varying Virtual Worlds From Real World Events", The Robotics Institute/Carnegie Mellon University, a total of 8 pages, Oct. 1997.
European Search Report, Application No. 09150710.3, Sep. 17, 2009, a total of 14 pages.

* cited by examiner

*Primary Examiner* — Chan S Park
*Assistant Examiner* — Nancy Bitar
(74) *Attorney, Agent, or Firm* — Squire Sanders (US) LLP

(57) ABSTRACT

The present invention relates to a technique for detecting dynamic (i.e., moving) objects using sensor signals with 3D information and can be deployed e.g. in driver assistance systems.

15 Claims, 3 Drawing Sheets

Dense 3D data of the scene (3D positon coordinates are projected to the image plane for visualization purposes only, the 3D warping procedure uses a 3D voxel cloud/3D positions in world coordinates without any projection to the image plane)

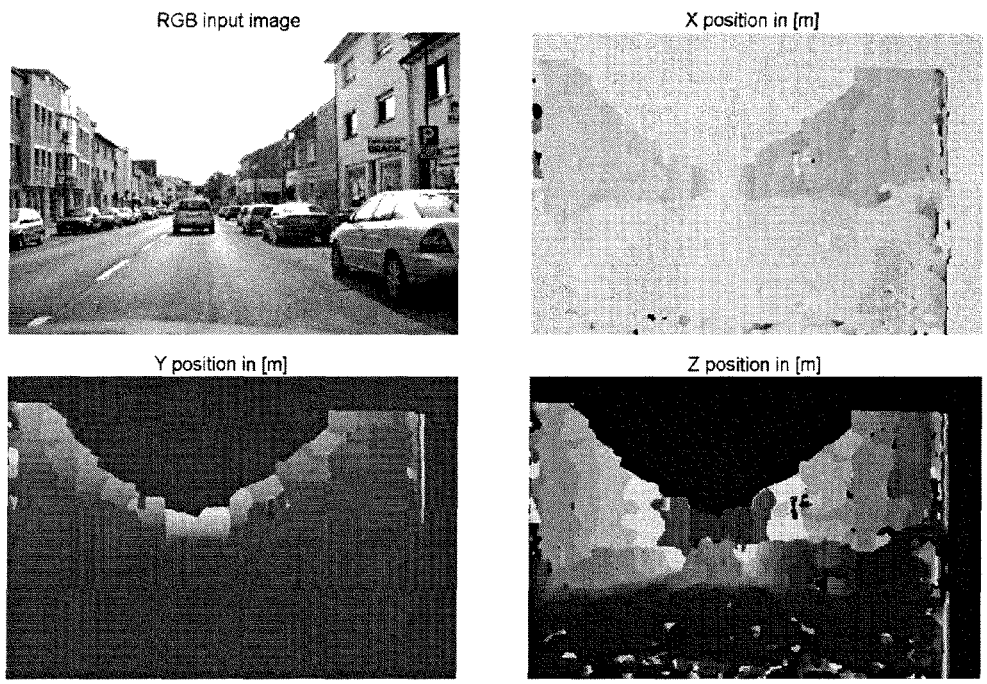
Figure 1: Dense 3D data of the scene (3D positon coordinates are projected to the image plane for visualization purposes only, the 3D warping procedure uses a 3D voxel cloud/3D positions in world coordinates without any projection to the image plane)

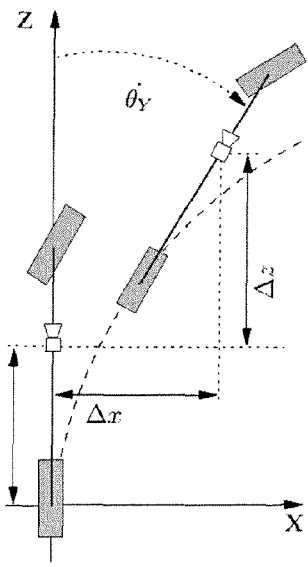
Figure 2: Single track model
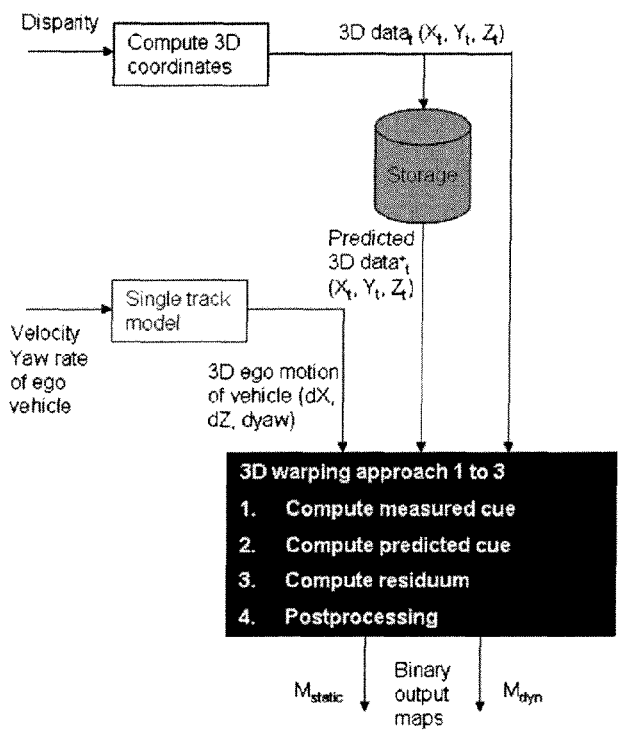
Figure 3: System overview

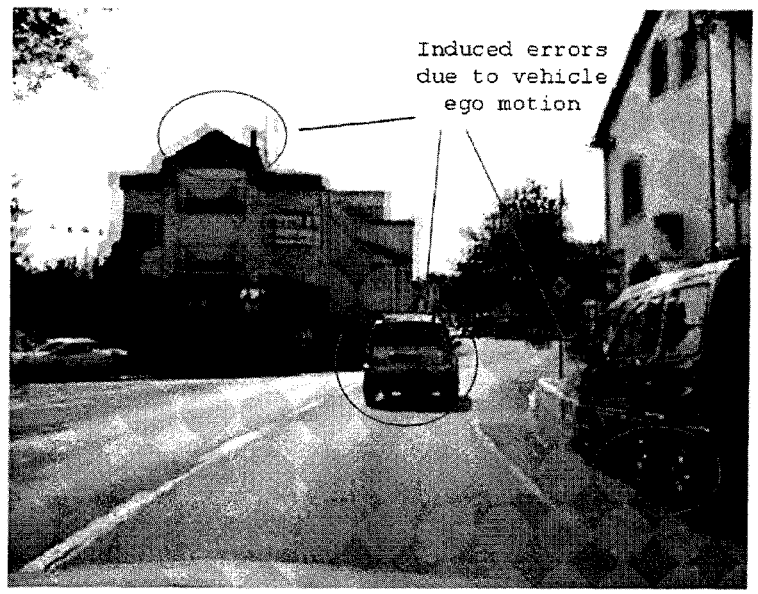
Figure 4: Two consecutive images in superposition showing potential difficulties of differential images as feature for detecting dynamic objects

SYSTEM AND METHOD FOR OBJECT MOTION DETECTION BASED ON MULTIPLE 3D WARPING AND VEHICLE EQUIPPED WITH SUCH SYSTEM

FIELD OF INVENTION

The present invention relates to a technique for detecting dynamic (i.e., moving) objects using sensor signals with 3D information and can be deployed e.g. in driver assistance systems.

Driver assistance systems are control systems for vehicles (cars, motorbikes, planes, boats, . . . ) or intelligent vehicle technologies that aim at increasing the comfort and safety of traffic participants. Potential applications of such systems include lane departure warning, lane keeping, collision warning or avoidance, adaptive cruise control and low speed automation in congested traffic.

Document [12] describes a typical application of such a system, a complex Advanced Driver Assistance System (ADAS), that in important aspects searches inspiration in the organization and the features of the human brain. A structure of such a driver assistance system is described in detail, highlighting typical challenges such a system is faced with in real world outdoor scenarios. The real time capability of the system is shown by integrating it in a prototype vehicle. It is applied in a rather typical traffic scenario where the system issued an autonomous braking of the carrying vehicle. The described system relates to the invention insofar as is shows the typical challenges such a system is faced with. Furthermore, a rather comprehensive background to the technical state-of-the-art in driver assistance is given.

Driver assistance systems in the context of the present invention can thereby "assist" an action triggered or performed by a driver, but can also autonomously start and carry out a control action for the vehicle. In the latter case the driver assistance system outputs a control signal to one or more actuators of the vehicle. A vehicle in this sense is driven by a human driver who takes into account the feedback provided by the assist system(s).

The driver assistance system can be provided with information on the environment of the vehicle, the status of the vehicle and the driver. This information is supplied by sensors sensing e.g. visually the environment of the vehicle.

The application of the invention which will be used for illustration purposes in the present specification is the car domain. However, the invention is not limited to this application domain, but can also be applied to other domains as airplanes in the take off or landing phase or for mobile robots. Also in these domains the detection of dynamic objects is of vital importance for safe operation.

BACKGROUND

Driver assistance systems are already a very valuable support for the driver and will be even more so in the coming years. Driver assistance systems operate with and in the vicinity of human beings, which leads to high safety requirements, when a driver assistance system is able to make decisions and autonomously generate behavior (e.g., autonomous braking after the detection of an obstacle on the lane). The vehicle domain can be subdivided into dynamic (e.g., cars, bicycles) and static objects respectively static scene elements (e.g., parking cars, road, buildings).

For all static scene elements the system has to cope with the inaccuracy of measurements (i.e., the sensor variances), for whose compensation a number of efficient, well-known approaches exist (e.g., Kalman filter [1] for making approaches more robust that rely on noisy input data, as model-based lane marking detection systems [2]).

For dynamic scene elements in addition to the handling of sensor variances the object induced motion must be taken into account. In the following, the motion of such dynamic objects will be called "object motion", as opposed to the "vehicle ego motion" of the car that carries the ADAS (Advanced Driver Assistance System, see document [12] summarized above for comprehensive background information on this term and an exemplary ADAS for assisting the driver) and sensory devices. Said dynamic objects are highly relevant for a driver assistance system, since unexpected motion of dynamic objects can result in dangerous situations that might injure humans. Hence, approaches which robustly gather information about scene elements that are dynamic, are highly relevant for driver assistance systems.

Once the scene is subdivided into static and dynamic scene elements for all dynamic objects the object motion can be modeled in order to incorporate it into the behavior generation and planning of the driver assistance system (e.g., usage of dedicated motion models for estimating the trajectories of dynamic object and including them into the collision mitigation module).

Vision-based approaches in the surveillance domain use differential images for detecting dynamic objects. Here, an image at time t is subtracted by the one at time t−1. But due to the ego motion of the camera the differential images cannot detect dynamic objects reliably, as it is shown in FIG. 4. The vehicle ego motion causes a change in nearly all image pixel positions, making a reliable separation between vehicle ego motion and object motion impossible.

Other approaches [6] combine the optical flow with the disparity map of a stereo camera system based on Kalman filters, which provides the 3D position and 3D velocity of single points in the image. These single points are used to compute the ego motion of the camera vehicle over multiple frames. However, the motion of other objects is computed based on optical flow computation between a predicted 2D warped pixel image and the current image.

In document [13] a system for the detection of moving humans in an indoor environment is described. The system is carried by a mobile robot that fulfils a surveillance task. The system is based on a camera setup of 36 stereo cameras that allow 360 degree surveillance.

Typical systems for the detection of dynamic objects compute the optical flow (pixel-wise correlation of two consecutive images deriving the motion magnitude and direction on the image plane) between a predicted (warping of the previous image, counteracting the ego-motion of the robot) and the current captured image. The optical flow will be different from zero for image regions containing dynamic (i.e. ego-propelled) objects.

Opposed to that the system described in document [13] relies on stereo data for the computation of a depth map of the scene. Using the depth map of the previous frame and dead reckoning the ego-motion is compensated, leading to a predicted depth map. Computing the difference between the predicted and measured depth map results in differential depth map (in image coordinates) that shows unexpected peaks at regions containing dynamic objects. However, the question as to how the resulting depth map is post processed remains unanswered because each moving object will cause 2 regions of changed depth (the new position and the old position). In a comparatively static indoor scene simple heuristics might be applicable to solve the problem of finding the current object position. Still, this point stays open.

The system of document [13] relates to the invention insofar as that the important role of stereo information for the detection of dynamic objects is recognized. However, the approach works on the depth map and therefore in image coordinates, as typical optical-flow-based image-warping-approaches. As opposed to classical approaches a correspondence problem arises, since all moving objects influence the differential depth map twofold (peak on the old and the new object position, no information in the differential depth map present to derive which position is which). Furthermore, the domain of application is indoors on a mobile robot platform with the central application of surveillance of humans. With such a specific task and a rather structured environment, the detection task is eased considerably allowing the detection system to be tuned to its environment (search for objects in the height of humans, typical object size-related constraints are exploited, camera system is designed to detect close objects alone).

A somewhat related system for the detection of dynamic objects is presented in [14] being mounted on a mobile robot. The presented approach is based on a computed dense optical flow field and dense stereo disparity computed from the images of a pair of calibrated stereo cameras. Different from the system laid out in [13] the system computes an expected disparity map (the raw data for computing depth information) taking into account the ego-motion of the vehicle and compares this to the measured disparity map by computing a kind of "disparity flow". Modulo noise at a region containing a residual disparity flow marks dynamic objects. Summarizing, the approach computes the so-called 3D ego-flow (as stated explicitly by the authors, this should not be confused with 3D coordinates in X-Y-Z sense, see Section 2 of [14]), which is the 3D field of changes in u and v-image coordinates as well as the change in disparity.

Another approach using the optical flow to estimate dynamic objects is described in [7]. Here, the current image, at time t, is pixel-wisely back projected to the image at time t−1, taken the known ego movement into account and assuming that the overall scene is static. Afterwards the optical flow is used to detect dynamic objects by using the image t−1 and the image at time t back projected to t−1. The resource demands for the method are even higher as with the approach described before, because the transformation of each image pixel has to be done beforehand. Also the optical flow detection of dynamic objects is suited for lateral movement only, which leads to poor results in case dynamic objects move longitudinally in the depth direction.

A method which uses only disparity as information is described in [8]. The algorithm integrates previous disparity frames with the current one based on a pixel wise Kalman filtering method. Additionally, the change of disparity (i.e. position change in depth direction) is added in the process model of the Kalman filter. However, no lateral and vertical movements can be modeled. The approach is targeted at improving the depth information, while trying to solve the problem that previous approaches generate incorrect depth estimates for moving objects. Summarizing, the approach aims at gathering a dense depth map, with reduced errors by applying temporal integration. As a byproduct, dynamic objects can be detected, but only in case no lateral object motion takes places on the image plane.

All these methods rely on the optical flow for object motion detection, hence searching for pixel wise changes on the image plane. It is important to note, that the optical flow is resource demanding as well as error prone, especially at the borders of the image. However, the central problem and flaw of the warping approach with optical flow is that only object motion lateral to the movement of the ego camera vehicle can be detected (e.g., a bicycle crossing the road in front). However, motion that is oriented longitudinal to the vehicle course can not be detected, since there is no measurable lateral motion on the image plane and hence no optical flow present (e.g., a vehicle driving on the road in front brakes hard and gets nearer).

OBJECT OF THE INVENTION

The invention proposes an efficient approach to detect dynamic objects in a signal representing the environment ("scene") of a vehicle.

This object is achieved by means of the features of the independent claims. The dependent claims develop further the central idea of the present invention.

A first aspect of the invention relates to a method for detecting dynamic objects in a scene representation e.g. in a driver assistance system of a vehicle, comprising the steps of:
  supplying signals from internal and external sensors of a vehicle, wherein at least one external sensor is a 3D sensor,
  generation of a scene model in 3D world coordinates based on the supplied external sensor signals,
  predicting the scene model in 3D world coordinates taking into account the measured ego-motion of the vehicle,
  comparing the predicted scene model with a scene model in 3D world coordinates based on external sensor signals in order to detect the location of dynamic objects in the scene representation as well as their motion parameters, respectively, expressed in 3D world coordinates, and
  storing the detected dynamic objects and their motion parameters.

The step of predicting the scene model in 3D world coordinates taking into account the measured ego motion of the vehicle may use information gained from sensors for the longitudinal velocity and yaw rate of the vehicle.

The step of predicting the scene model in 3D world coordinates in taking into account the measured ego motion of the vehicle can comprise one or more of the following steps:
  a) Iconic 3D warping directly on the 3D world coordinates computed the sensor signals,
  b) use of top-down knowledge of scene knowledge, wherein known static objects are handled independently,
  c) region-based 3D warping that allows the inclusion of scene knowledge in form of environmental models and plane models in order to decrease noise in the sensor signals (measured noise of the depth values), and/or
  d) using an environmental envelope for the planes of interest to reduce the complexity of the 3D warping procedure.

Information from a 3D depth sensor such as e.g. rotating laser scanner can be used to generate the external sensor signals.

Information from a 2D depth sensor such as e.g. Photonic Mixer Device can be used to generate the sensor signals.

Information from a 1D depth sensor such as e.g. a laser scanner can be used to generate 3D data.

Information from a satellite-based navigation system may be used to generate 3D data and/or for generating environmental information.

A further aspect of the present invention relates to a driver assistance computing unit, designed to carry out a method according to any of the preceding claims.

A still further aspect relates to a vehicle being equipped with such a driver assistance computing unit.

Yet a further aspect relates to a computer program product, implementing a method as explained above when run on a computing unit.

The invention also proposes a driver assistance system with a model generation apparatus, the model generation apparatus comprising:
- at least one 3D sensor for supplying environmental signals to the driver assistance system,
- computing means for generating a 3D world model based on the signals of the at least one 3D sensor and means for detecting dynamic objects based on the sensor signals in the 3D world,
- storing means for storing the detected dynamic objects and their motion parameters,
- means for determining whether to carry out an driver assistance action based on the detected dynamic objects, and
- means for carrying out a driver assistance action.

The sensors may comprise video cameras.

The driver assistance action may be an emission of a warning message.

Opposed to known methods, the here described approach is based on depth data as well as internal sensor data (e.g., ego vehicle velocity) alone and no restrictions regarding the supported object motion (lateral, longitudinal) exist.

The described approach is different from the existing approaches in the following points:
- No computational demanding optical flow (processing of a stream of video data) is needed, which reduces the computation time and increases quality. (According to www.wikipedia.en.org "Optical flow or optic flow is the pattern of apparent motion of objects, surfaces, and edges in a visual scene caused by the relative motion between an observer (an eye or a camera) and the scene".)
- Known optical flow-based approaches can detect object motion that is orthogonal to the ego vehicle motion (lateral motion). Different from that the proposed approach also detects object motion in the direction of the ego vehicle (longitudinal motion direction).
- Different from optical flow-based approaches that detect object motion on the image plane (i.e., in pixels in the perspective image), the proposed approach delivers information of the object motion in 3D world coordinates (i.e., magnitude and direction in meters). Hence, instead of predicting the pixel-wise motion of image pixels (called warping) the described approach runs on and predicts 3D world coordinates directly (in the following called 3D warping as opposed to the pixel-wise warping on the image plane).
- As opposed to optical flow based approaches once a dynamic object is detected its motion in 3D coordinates is accessible. Optical flow based approaches give object motion in pixel coordinates on the image plane only.

Further aspects, objects and advantages of the present invention will become evident for the skilled person when reading the following detailed description of preferred embodiments of the invention when taken in conjunction with the figures of the enclosed drawings.

FIG. 1 shows dense 3D data of a scene, i.e. the environment of a vehicle, produced e.g. by a still or video camera.

FIG. 2 illustrates a single track model of a car.

FIG. 3 shows an overview of a system according to the present invention.

FIG. 4 shows two consecutive images in superposition in order to illustrate potential difficulties of differential images as feature for detecting dynamic objects.

TERMS AND DEFINITIONS (GLOSSARY)

In the following, terms used throughout the description are defined. This glossary should facilitate a better understanding of the present invention.

Top-Down Knowledge:
Information coming from other modules in the system with higher level of information integration, e.g. the environmental model representing all detected objects.

Driver Assistance System (DAS):
A system supporting a driver in typical driving tasks as well as in dangerous situations. Following German traffic laws (Straßenverkehrsordung StVO) the DAS reactions must stay controllable and must allow overruling influence by the driver. Based on that fully autonomous behavior generation is not possible for DAS on the market. Often warning systems of a car are implementations of DAS.

Advanced Driver Assistance System (ADAS):
A Driver Assistance System that incorporates numerous modules and links between modules. All these components are integrated into a complex framework of sensors, computational hardware and actors that all are intertwined and interact. As opposed to that a conventional Driver Assistance System is marked by a restricted complexity and a lack of interfaces for the sharing of information with other modules in the vehicle. Additionally, a conventional Driver Assistance System is targeted at a single task and application area (e.g. highway).

Environmental Envelope:
The X-Z plane (horizontal position coordinate and depth) is an aggregated part of the 3D voxel cloud. Still the environmental envelope is represented in the 3D domain (height Y is constant) and is not projected to the image for detecting dynamic objects. Therefore, the envelope is an illustration for the border line to the first objects in an X-Z plane. The number of X-Z planes with different heights can vary and also be used to approximate certain height intervals in one or more X-Z planes. The environmental envelope contains a subset of 3D position coordinates for all scene objects. No gray value pixels from a camera are remapped but the height value Y. An environmental envelope also does not depend on any image feature (e.g. color, structures)—it is computed based on 3D data alone.

External Sensor:
Can be any kind of depth sensor, such as 3D depth sensor (e.g. rotating laser scanner), a 2D depth sensor (e.g. Photonic Mixer Device), a 1D depth sensor (e.g. a laser scanner), Stereo camera, etc. Also a navigation system can be seen as an external sensor, thus it can provide detailed information about the environment. Therefore, a navigation system can be a virtual external sensor, using the current GPS position and its map data to provide depth information of the current surrounding. In general, the meaning for external sensor is a sensor that gathers/provides information of the surrounding environment.

Internal Sensor:
In general, this is a sensor that gathers/provides information of vehicle movement independent of information from the environment. This can range from a simple speed indicator (measuring the wheel rotation) up to a ring laser gyroscope for the angle of rotation.

Internal Sensor Data:
Internal sensor data is data which is produced by sensors detecting states and characteristics of the vehicle itself.

Prediction in Future/Passed Time:
For detecting ego-moved objects in general two ways of prediction exist. On the one hand, the straight forward approach, were the scene model at time t−1 is predicted into the next time step t in the future (forward warping). Afterwards, the prediction is compared with the measurement and the ego moved objects extracted.

On the other hand, the measurement of the current time step t can be projected to the previous time step t−1, which we refer to the passed time (or backward warping). And the previous measurement is compared with the projection and the ego moved objects extracted.

Scene Model:

Based on other processing modules, like the current scene context (e.g. highway, country road, inner city) and measurements from the current surrounding environment, certain models can be learned or extracted. To this end, when driving on a highway the guardrails can be extracted by a combination of measurement and knowledge incorporation. Additionally, a data driven approach can be used fitting typical geometric shapes to the measured data.

Scene Representation (also 3D Representation):

A 3D representation abstracts from the sensor layer and is not bound to a single sensor. To this end, a 3D representation can be a 3D-grid, a voxel-graph, etc. Therefore, a 3D representation maps a certain part of the surrounding environment to its internal memory, but decoupled of the sensor layer.

DETAILED DESCRIPTION OF EMBODIMENTS

The invention proposes a 3D warping approach which is a novel robust procedure for detecting dynamic objects and computing the magnitude of object motion based on sensors delivering a representation of the environment ("scene") in 3D world coordinates (e.g., disparity information coming from stereo cameras [3], Photonic Mixer Device [4], or a dense laser scanner (e.g., the high definition Lidar sensor Velodyne [5])).

The inventive system uses depth sensors (e.g. two cameras) that sense the environment in driving direction of the vehicle. While "frame-out" (i.e., an object gets out of view) occurs, an additionally incorporated environmental model also contains objects detected in the past that are predicted when out of view of the cameras. The inventive system allows for a real-time application since computational costs are considerably low. Moreover, the system is designed for outdoor application in steadily changing environments where objects previously unknown to the system need to be assessed immediately. The system hence is designed for long-range application needed in the car domain, e.g., to allow the driver to react in time based on the feedback from the assist system to prevent an accident.

The inventive system is primarily designed to be installed in car and hence is able to deal with changing weather and/or illumination, high velocity of the vehicle and other dynamic objects. In this it goes beyond the functionality of common indoor systems, as e.g. described in document [13]. Operation in indoor environments restricts the complexity of performed detection tasks. On the other hand, such indoor scenes are much more stable and are marked by rather low complexity in terms of the 3D structures. Fully autonomous vehicles such as mobile robots which are not required to move fast can use abundant computing resources, while no hard real-time requirement is present. Furthermore, the well-structured indoor environment allows numerous restrictive assumptions not available for the car domain. This is due to the fact that strict real-time requirements exist while the system runs in a complex, rather unstructured environment under changing environmental conditions. Hence novel, elaborate approaches are required.

The detection of objects in the inventive system happens in a 3D space and not simply in image coordinates derived from depth images (depth is only one dimension of the 3D space). Therefore, the inventive system uses 3D coordinates (e.g. voxel clouds) because of which a occlusion phenomenon is not present during the prediction step. In previous systems using image coordinates (spherical image), the occlusion phenomenon is a problem (cf., e.g., document [13], occlusion is caused by static and dynamic objects when a system works in image coordinate systems). An approach for solving this problem may be shown in document [13] for static objects, but not for dynamic objects. An advantage of the use of 3D coordinates throughout the system (in obtaining information, for the scene representation and in a following prediction step) is that no transformation of image data into a 3D space is required.

While previous systems do not abstract from the sensor layer and perform computations directly in camera coordinates (on the image plane), the result of which is another camera image (differential depth image in camera coordinates), the inventive system relies on a 3D representation. The 3D representation abstracts from the sensor layer and is not bound to a single sensor. The 3D representation in this sense is a 3D-grid, a voxel-graph, etc. A depth map obtained by previous systems can, however, not be considered as a 3D scene representation in the sense of the invention. The depth map is organized in image coordinates; it contains the Z coordinate of the scene projected by non-linear equations to the image plane. Opposed to that, the presented algorithm runs on 3D coordinates (X, Y, Z) building e.g. a 3D voxel cloud. An advantage of this approach is that the 3D motion parameters (motion magnitude and 3D direction) of dynamic objects can be determined. From a depth map only image regions containing dynamic objects without further information of the motion parameters can be determined.

The detection results in common systems often are image regions with changes in depth. The gathered results, however, are ambiguous (i.e. how many moving objects are present? Were is the old and where is the current object position?). This should be clarified by an example. Imagine a person moving from left to right. This causes a depth increase on the left and a depth decrease on the right. The same result would be measured in case of 2 persons (one left of the camera, the other right of the camera) changing their distance to the camera diametrically. As in the case of the person moving from left to right, the differential depth map holds a peak at the old and the new object position. Based on the differential depth map alone, this problem can only be solved in a well structured, rather simple environment such as an indoor scenario. For more complex scenarios as in the car or traffic domain the interpretation of the ambiguous differential depth map is impossible. The invention instead derives unambiguous 3D motion parameters (motion magnitude and direction) of detected dynamic objects, since the dynamic object detection is done in 3D space.

Also, while previous systems rely on image data, which is required to extract the texture/edges and do a correspondence search for the slant recovery, the invention does not require any image data but only depth information. Furthermore, the yaw and pitch angles of camera do not need to be estimated to recover the slant.

The present invention also has no immanent restriction of the detectable object class. The movement of every object of every magnitude and direction is supported. Other system restrict their search space of moving objects to humans or other specific object classes and therefore these approaches make (and are able to make) certain assumptions about the appearance (e.g., height, width, etc.) of moving objects. This, obviously, is not suitable for the inventive system applied in the car domain.

In a nutshell, the detection of dynamic objects is based on the comparison of predicted (i.e., 3D warped) and measured 3D data of the scene. More specifically, in the 3D warping procedure the 3D world coordinates of the scene (containing static and dynamic objects) at one time step are transformed in a way that includes the motion of the ego vehicle expressed in terms of 3D coordinates. The 3D motion of the ego vehicle can be gained using sensors for the longitudinal velocity and yaw rate of the vehicle, both typically accessible e.g. on the CAN bus in a car, using a single track model. In the following, the procedures for the forward 3D warping (and backward 3D warping, set in brackets) are described.

To be more precise, the 3D world coordinates of the scene at a time step are predicted into the future [backwards in time] under the assumption that all objects in the scene are static. The 3D world coordinates of the scene are predicted based on the measured ego vehicle motion induced longitudinal and lateral motion as well as yaw rate coming from a single track model (refer to FIG. 2). The thereby predicted a priori 3D world position is compared to the measured a posteriori 3D world position in the next time step [previous time step]. The residuum (difference) of the comparison between 3D warped and real 3D world position marks all dynamic scene elements. The residuum is given in metric world coordinates (i.e., a 3D object motion induced position change).

Additionally, the corresponding pixel position of the detected dynamic object can be computed by use of a pin hole camera model. Based on the pin-hole camera model the transformation equations to compute the 2D image position (u,v) from a given 3D world position (X,Y,Z) are the following (refer to Equations 1 and 2). Here $\theta_X$, $\theta_Y$, and $\theta_Z$ are the 3 camera angles. Furthermore, $t_1$, $t_2$, and $t_3$ are the three camera offsets from the center of the coordinate system. The parameters $v_0$ and $u_0$ are the vertical and horizontal principal points of the camera (approximately the center of the image). The parameters $f_u$ and $f_v$ are the focal lengths normalized to the horizontal and vertical pixels size (see document [11] for a comprehensive description of the following equations; the equation are, however, used in another technical context namely for the generic improvement of unmarked road detection results).

$$u = -f_u \frac{r_{11}(X - t_1) + r_{12}(Y - t_2) + r_{13}(Z - t_3)}{r_{31}(X - t_1) + r_{32}(Y - t_2) + r_{33}(Z - t_3)} + u_0 \quad (1)$$

$$v = -f_v \frac{r_{21}(X - t_1) + r_{22}(Y - t_2) + r_{23}(Z - t_3)}{r_{31}(X - t_1) + r_{32}(Y - t_2) + r_{33}(Z - t_3)} + v_0 \quad (2)$$

with $Y = 0$, $$R = R_X R_Y R_Z = \begin{bmatrix} r_{11} & r_{12} & r_{13} \\ r_{21} & r_{22} & r_{23} \\ r_{31} & r_{32} & r_{33} \end{bmatrix},$$

and
$r_{11} = \cos(\theta_Z)\cos(\theta_Y)$
$r_{12} = -\sin(\theta_Z)\cos(\theta_X) + \cos(\theta_Z)\sin(\theta_Y)\sin(\theta_X)$
$r_{13} = \sin(\theta_Z)\sin(\theta_X) + \cos(\theta_Z)\sin(\theta_Y)\cos(\theta_X)$
$r_{21} = \sin(\theta_Z)\cos(\theta_Y)$
$r_{22} = \cos(\theta_Z)\cos(\theta_X) + \sin(\theta_Z)\sin(\theta_Y)\sin(\theta_X)$
$r_{23} = -\cos(\theta_Z)\sin(\theta_X) + \sin(\theta_Z)\sin(\theta_Y)\cos(\theta_X)$
$r_{31} = -\sin(\theta_Y)$
$r_{32} = \cos(\theta_Y)\sin(\theta_X)$
$r_{33} = \cos(\theta_Y)\cos(\theta_X)$ Although the approaches handled in document [15] are closer to the domain of special effects and virtual reality and hence are somewhat different from the scientific community treating intelligent transportation systems, some technical background is covered that is of importance for the present invention. More specifically, the document describes typical challenges a warping algorithm is faced with under ego-motion of the camera. Furthermore, the issue of stereo camera calibration, optical flow computation, occlusion (holes appear as consequence of image warping) and 3D-coordinate-to-image transformation is covered. All these aspects also play an important role in the present invention and hence [15] can serve as a document of reference for better understanding the sub-modules of the present invention.

In the following, the 3D warping approach is described, distinguishing four processing steps, which are visualized in FIG. 3.

Computing the Measured Cue

The approach described here uses dense 3D data as input, which can be derived e.g. from 2 parallel cameras. In this context, "dense" means that for the whole scene data exists. More specifically, the images of the two parallel cameras are compared region-wisely based on a correlation approach. For all pixels in the image a horizontal shift can be determined, which is called disparity. The disparity D(u,v) is inversely proportional to the depth Z (see Equation 3). Thereby, for all pixels in the image a depth value exists. Based on this a dense depth map (Z-map), a dense height map Y and X-map that contains the horizontal position of all pixels in the image can be computed (see Equation 4 and 5, refer to FIG. 1). In Equation 4 and 5, $t_1$ and $t_2$ define the position of the camera relative to the coordinate system, B is the horizontal distance of the cameras (stereo basis), v and u are the vertical and horizontal pixel position, $v_0$ and $u_0$ define the principal point, $f_u$ and $f_v$ are the vertical and horizontal focal length.

Other dense depth sensors, as for example, Photonic Mixer Device [4] or a dense laser scanner [5] can also be used, as the only input of the system. Based on these sensors, the X, Y, and Z-maps (i.e., depth map) representing the scene can be computed as well. Hence, image data is not needed in the described approach.

$$Z_{stereo}(u, v) = \frac{f_u B}{D(u, v)} \quad (3)$$

-continued $$Y_{stereo}(u, v) = \frac{Z(v - v_0)}{f_v} + t_2 \quad (4)$$

$$X_{stereo}(u, v) = \frac{Z(u - u_0)}{f_u} + t_1 \quad (5)$$

2. Computing the Predicted Cue

The computation can be done in different ways as well as combinations of the different ways, regarding the amount of processed data. Three different computational methods are proposed here, which are iconic-based, voxel-based, and envelope-based computation. In the following the different computational methods are described.

Overview:

The first computational method (2.1) runs completely iconic (i.e., all 3D voxels are handled independently). More specifically, this means that the known 3D positions of all known points in the environment are adapted taking the 3D vehicle ego motion into account. The 3D translation and rotation of the vehicle is used to 3D warp each point independently. Then the predicted (3D warped) and the measured points are compared to determine dynamic objects based on the residuum, which can be done by any distance metric in 3D space.

The second computational method (2.2) builds up a 3D voxel cloud (i.e., cloud of 3D segments) of the scene. Different from the first iconic approach a region based post-processing and modeling within the voxel cloud takes place. Thereby information from neighboring voxels is propagated and geometric 3D object models are introduced, which correct outlying voxels. These measures improve the overall accuracy of the approach.

The third computational method (2.3) reduces the problem complexity by restricting the processing to one (or a few) surface(s) in the environment. In the car domain this could be the road surface. Only scene elements on this surface are considered. Based on this information an envelope is build up, which is called environmental envelope, reducing the complexity of the problem.

2.1 Iconic-Based Method

The 3D world position of all points (u,v) at time step t−1 (for backward warping at time t) is read from the maps X(u,v), Y(u,v), and Z(u,v) (refer to FIG. 1) and adapted by the measured ego motion of the car coming from the CAN bus (translational motion $\Delta X$, $\Delta Y$, and rotational motion $\Delta\theta_Y$).

Therefore, results are predicted point positions for time step t (for backward warping at time t−1) that take the vehicle ego motion into account. Every predicted point position was 3D warped assuming a completely static scene. The point positions are used as predicted cue.

2.2 Voxel-Based Method

A 3D voxel (i.e., a 3D point segment) cloud is build from 3D world coordinate maps X, Y, and Z of the scene (refer to FIG. 1). Based on an appropriate discrete 3D grid, the voxel cloud contains holes and points are misplaced due to the sensor variance. These inaccuracies can be improved by 3D environmental models (e.g., determining surfaces and include object models) that would close holes and adjust incorrectly placed voxels in the cloud. Furthermore, by including domain-specific context knowledge, surfaces can be determined by multidimensional regression (see, e.g. [9]). Such models can be used to close holes and correct (i.e., move) voxel coordinates. After that, the voxel cloud of time step t−1 (for backward warping time t) can be adapted according to the measured vehicle ego motion. More specifically, the cloud is translated by $\alpha X$ and $\alpha Z$ as well as rotated by $\alpha\theta_Y$, which yields the predicted (i.e., 3D warped) voxel cloud of time step t (for backward warping time t−1). After that all point positions of the predicted voxel cloud are used as the predicted cue.

2.3 Region Based Method (Environmental Envelope)

Additional to the computation of the measured cue in part 1, a number of points are extracted, which form the region to detect dynamic objects. More specifically, a surface is chosen resulting in an envelope in the Z,X plane for each time step. Based on this surface, a curve is extracted, which represents the distance of the closest obstacle on the defined surface and horizontal position.

Put differently, the curve is an environmental envelope of the scene elements on the defined Y-surface.

For computing this curve the following procedure is carried out: Since only objects positioned on the road surface are of interest, only values on the height map Y(u,v) that are within the proximity of the height zero are considered. The so selected height values Y(u,v) are then mapped to an array representing the X,Z surface by reading out the horizontal position X(u,v) and depth Z(u,v). The derived X,Z surface contains an unconnected point cloud. The mapped height values Y(u,v) are connected by splines forming the measured cue. This can also be done with a number of environmental envelopes of different height and also using certain height intervals.

Based on this procedure, the measured environmental envelope of the previous time step t−1 (for backward warping time t) is computed. The resulting curve of time step t−1 (for backward warping time t) is translated by $\Delta X$ and $\Delta Z$ as well as rotated by $\Delta\theta_Y$, which results in the predicted environmental envelope of time step t (for backward warping time t−1).

3. Computing Residuum

Computing the difference (residuum) between the measured cue (3D warped point positions for method 1 and 2 (also 3D warped voxel clouds), 3D warped environmental envelope for method 3) and the predicted cue results in residuum's that contain values at positions where dynamic objects must be present. Moreover, from the residuum the relative motion of the dynamic object in 3D coordinates can be derived. For the computation of the residuum every 3D distance metric can be applied.

For methods 1 and 2 the residuum directly defines regions that hold dynamic objects as well as the magnitude of the object motion in 3D coordinates. For method 3 the residual environmental envelope defines the motion of dynamic objects in X and Z direction only (height Y is defined as constant over the whole environmental envelope). For determining the corresponding world position all found dynamic objects are mapped to the corresponding surface height. This results in line segments in 3D coordinates, which are positioned on the selected surface (e.g., the road). Hence, these line segments mark the lower border of all dynamic objects present on the surface.

In order to determine a region for the object, the image plane could be used with a vision based segmentation approach (see [10]) (e.g., based on similar depth values, structure or color), which takes the found lower object border into account.

4. Post-Processing

In order to handle artifacts the described procedure might produce, morphological operations on the binarized residuum's are carried out (see [10]). This assures that only larger regions of residuum's are interpreted as being dynamic. Furthermore, when using camera-based depth data a quality map is derived, during the computation of the stereo disparity based on Normalized Cross-Correlation (NCC). This quality map assesses how good the NCC match for each pixel and its region was. Therefore, this quality map can be used to weight the values in the residuum. Furthermore, by including vehicle domain specific context (top-down knowledge), all objects that are known to be static (e.g., found road segments) can be sorted out, easing the 3D warping procedure. Additionally, data from a satellite-based navigation system can be incorporated providing further knowledge of the scene, e.g., 3D GPS position for static scene content)

The described computation methods have different advantages and drawbacks making them more or less applicable in different domains and applications, as summarized in the following Table 1. Table 2 summarizes the differences between existing pixel based 2D warping procedures and the here proposed 3D warping approach on 3D coordinates.

Prior Art:

[1] R. E. Kalman, "A new approach to linear filtering and prediction problems," *Transactions of the ASME-Journal of Basic Engineering*, vol. 82, no. Series D, pp. 35-45, 1960.

[2] M. Nieto, L. Salgado, F. Jaureguizar, and J. Cabrera, "Stabilization of inverse perspective mapping images based on robust vanishing point estimation," in *IEEE Intelligent Vehicles Symposium*, 6 2007.

[3] K. Konolige, "Small vision system: Hardware and implementation," in *Eighth International Symposium on Robotics Research*, 1997.

[4] Xuming Luan, "Experimental Investigation of Photonic Mixer Device and Development of TOF 3D Ranging Systems Based on PMD Technology", PHD Thesis, 2001.

[5] www.velodyne.com/lidar

[6] H. Badino, U. Franke, C. Rabe and S. Gehrig. "Stereo Vision-Based Detection of Moving Objects under Strong Camera Motion". In 1st International Conference on Computer Vision Theory and Applications (VISAPP), Setúbal, Portugal. 25-28 Feb. 2006.

[7] J. Schmüdderich, V. Willert, J. Eggert, S. Rebhan, C. Goerick, G. Sagerer and E. Korner. "Estimating object proper motion using optical flow, kinematics, and depth information" in IEEE Transactions on Systems, Man and Cybernetics, Part B, Volume 38, Issue 4, Pages 1139-1151, 2008.

[8] T. Vaudrey, H. Badino and S. Gehrig "Integrating Disparity Images by Incorporating Disparity Rate". In 2nd Workshop "Robot Vision", Auckland, New Zealand, Feb. 18-20, 2008.

[9] I. N. Bronstein, K. A. Semendjajew, G. Musiol and H. Mühlig, "Taschenbuch der Mathematik", Verlag Harri Deutsch, Frankfurt am Main, 1999.

[10] B. Jaehne, "Digital image processing", Springer, Berlin, 2005.

[11] T. Michalke et. al. "A Generic Temporal Integration Approach for Enhancing Feature-based Road-detection Systems", IEEE Intelligent Transportation Systems Conference, Beijing, 2008.

[12] J. Fritsch et. al.: "Towards a Human-like Vision System for Driver Assistance", IEEE Intelligent Vehicles Symposium, Eindhoven, 2008.

[13] S. Shimizu: "Moving object detection by mobile stereo omni-directional system (SOS) using spherical depth image", Pattern Analysis and Applications, vol. 9, no. 2-3, pages 113-126, 2005.

[14] A. Taluder et. al.: "Real-time detection of moving objects from moving vehicles using dense stereo and optical flow", International Conference on Intelligent Robots and Systems (IROS), Japan, 2004.

[15] P. Rander: "Virtualized reality: Constructing time-varying virtual worlds from real world events", Annual IEEE Conference on Visualization, pages 277-283, 1997.

TABLE 1

Comparison of the proposed computation methods for detecting dynamic objects

|  | Optical flow based 2D warping | Iconic 3D warping | Voxel cloud 3D warping | Region based 3D warping (environmental envelope) |
|---|---|---|---|---|
| Advantages | No camera para-meters (calibration) necessary No further sensors necessary | Accurate Relative motion of detected objects in world coordinates is determined Dynamic object moving in the direction of the ego vehicle can be detected | Very accurate | Fast |
| Drawback | Only objects with horizontal motion components Slow Low accurateness | Slow Needs dense depth data (vision based, PMD, laser scanner), the denseness and quality of such depth data could be improved by satellite-based navigation data, e.g., 3D GPS position for static scene content) | | Lower accuracy |

TABLE 2

Conceptional differences between pixel based 2D warping with optical flow and 3D warping on 3D coordinates

| Criterion | Optical flow based 2D warping | 3D warping on 3D coordinates |
|---|---|---|
| Input data | Consecutive images of a monocular camera, dense 3D data | Dense 3D data |
| Computational level | Pixels on the image | 3D world positions |
| Detectable abject motion | Lateral object motion (i.e., orthogonal to the motion of ego camera vehicle) | Longitudinal and lateral object motion (i.e., motion in the direction of the ego camera vehicle and orthogonal to it). |
| Output data | Detected object motion in pixels on the image plane between two consecutive images | Detected object motion in 3D coordinates |

We claim:

1. A method for detecting dynamic objects in 3D scene representation of a driver assistance system for a vehicle, the method involving working with 3D data in every method step, the method comprising the steps of:

supplying signals from internal and external sensors of a vehicle, wherein at least one external sensor is a 3D sensor supplying 3D data, wherein the at least one external sensor supplies data from a vehicle environment and at least one internal sensor provides data from the vehicle;

generating a 3D scene model based on the supplied 3D data, wherein every sensed object in the 3D scene model is represented in a 3D space as an object in 3D world coordinates of the 3D space, a depth of the 3D space being one dimensional;

creating a predicted 3D scene model by predicting 3D positions of all objects in the 3D scene model in the 3D world coordinates taking into account a measured ego motion of the vehicle;

detecting locations of dynamic objects in the represented 3D scene as well as motion parameters thereof, respectively, expressed in the 3D world coordinates, by calculating a residuum between the predicted 3D scene model and the 3D scene model in the 3D world coordinates using a 3D distance metric; and storing the detected dynamic objects and the motion parameters thereof.

2. The method according to claim 1, wherein the step of creating the predicted 3D scene model uses information gained from sensors for the longitudinal velocity and yaw rate of the vehicle.

3. The method according to claim 1, wherein the step of creating the predicted 3D scene model comprises one or more of the following steps:
  a) iconic 3D warping directly on the 3D world coordinates computed the sensor signals,
  b) using top-down knowledge of scene knowledge, wherein known static objects are handled independently,
  c) region-based 3D warping that allows the inclusion of scene knowledge in form of environmental models and plane models in order to decrease noise in the sensor signals, and/or
  d) using an environmental envelope for planes of interest to reduce the complexity of the 3D warping procedure.

4. The method according to claim 1, wherein information from a 3D depth sensor is used to generate the 3D data, the 3D depth sensor comprising a rotating laser scanner.

5. The method according to claim 1, wherein information from a 2D depth sensor is used to generate the 3D data, the 2D depth sensor comprising a photonic mixer device.

6. The method according to claim 1, wherein information from a 1D depth sensor is used to generate the 3D data, the 1D depth sensor comprising a laser scanner.

7. The method according to claim 1, wherein information from a satellite-based navigation system is used to generate the 3D data and/or for generating environmental information.

8. A driver assistance computing device, designed to execute instructions stored in a non-transitory computer readable medium, to carry out the method according to claim 1.

9. A vehicle being equipped with a driver assistance computing device according to claim 7.

10. A computer program embedded on a non-transitory computer readable medium, the computer readable medium implementing a method according to claim 1 when run on a computing device.

11. A driver assistance system for a vehicle with a model generation apparatus working with 3D data, the model generation apparatus comprising:
  at least one 3D sensor for supplying 3D data to the driver assistance system;
  computing means for generating a 3D scene model in 3D world coordinates based on the 3D data of the at least one 3D sensor for creating a predicted 3D scene model by predicting 3D positions of all objects in the 3D scene model taking into account a measured ego motion of the vehicle, and for detecting locations of dynamic objects in the represented 3D scene as well as motion parameters thereof, respectively, expressed in the 3D world coordinates, by calculating a residuum between the predicted 3D scene model and the 3D scene model in the 3D world coordinates using a 3D distance metric; storing means for storing the detected dynamic objects and the motion parameters thereof;
  means for determining whether to carry out an driver assistance action based on the detected dynamic objects; and
  means for carrying out a driver assistance action.

12. The system according to claim 10, wherein the at least one 3D sensor comprises video cameras.

13. The system according to claim 10, wherein the driver assistance action is an emission of a warning message.

14. A driver assistance device designated to carry out a method according to claim 1.

15. A vehicle equipped with a driver assistance device according to claim 11.

* * * * *